United States Patent
Lee et al.

(10) Patent No.: US 10,606,620 B2
(45) Date of Patent: Mar. 31, 2020

(54) NOTIFICATION INTERACTION IN A TOUCHSCREEN USER INTERFACE

(71) Applicant: INTERNATIONAL BUSINESS MACHINES CORPORATION, Armonk, NY (US)

(72) Inventors: Eunjin Lee, Eastleigh (GB); Matthew A. Clarke, Peterborough (GB); Gareth J. H. Morgan, Loughton (GB); James Cockbain, Leighton Buzzard (GB); Peter Agorioge, London (GB)

(73) Assignee: International Business Machines Corporation, Armonk, NY (US)

( * ) Notice: Subject to any disclaimer, the term of this patent is extended or adjusted under 35 U.S.C. 154(b) by 55 days.

(21) Appl. No.: 15/814,549

(22) Filed: Nov. 16, 2017

(65) Prior Publication Data

US 2019/0146809 A1    May 16, 2019

(51) Int. Cl.
| | | |
|---|---|---|
| *G06F 3/00* | (2006.01) | |
| *G06F 9/451* | (2018.01) | |
| *G06F 3/01* | (2006.01) | |
| *G06F 3/0481* | (2013.01) | |
| *G06F 3/0488* | (2013.01) | |
| *H04M 1/725* | (2006.01) | |

(52) U.S. Cl.
CPC .............. *G06F 9/453* (2018.02); *G06F 3/017* (2013.01); *G06F 3/0481* (2013.01); *G06F 3/04883* (2013.01); *H04M 1/72519* (2013.01); *H04M 1/72563* (2013.01); *H04M 2250/22* (2013.01)

(58) Field of Classification Search
CPC .... G06F 9/453; G06F 3/0481; G06F 3/04883; G06F 3/017
See application file for complete search history.

(56) References Cited

U.S. PATENT DOCUMENTS

| | | | |
|---|---|---|---|
| 7,870,491 B1* | 1/2011 | Henderson | G06F 9/453 715/745 |
| 9,075,507 B2 | 7/2015 | Dempski | |
| 9,413,708 B1* | 8/2016 | Michael | H04L 51/24 |
| 9,508,161 B2 | 11/2016 | Rydenhag et al. | |
| 2009/0247112 A1 | 10/2009 | Lundy et al. | |

(Continued)

FOREIGN PATENT DOCUMENTS

WO    2012054215 A2    4/2012

OTHER PUBLICATIONS

Disclosed Anonymously, "System and Method for Transparently Presenting Users with Notifications and Pop-Up Windows While They Are Actively Working", IP.com Prior Art Database Technical Disclosure, IP.com No. IPCOM000200376D, Publication Date: Oct. 8, 2010, pp. 1-3.

*Primary Examiner* — Anil N Kumar
(74) *Attorney, Agent, or Firm* — Sean M. Douglass (57) ABSTRACT

Method and system are provided for notification interaction in a touchscreen user interface. The method includes: monitoring a user interaction with a current application via the touchscreen user interface; recognizing that a notification is being prepared to be displayed as a notification display on top of the current application; selecting a distinct user interaction for input to the notification display that is distinct from the monitored user interaction with the current application; and displaying an instruction for the distinct user interaction with the notification display.

20 Claims, 5 Drawing Sheets

(56) References Cited

U.S. PATENT DOCUMENTS

| | | |
|---|---|---|
| 2014/0109018 A1 | 4/2014 | Casey et al. |
| 2014/0189592 A1* | 7/2014 | Benchenaa ......... G06F 3/04886 |
| | | 715/835 |
| 2015/0172249 A1 | 6/2015 | Schneider et al. |
| 2015/0294432 A1* | 10/2015 | Jones ................... G06Q 50/265 |
| | | 705/325 |
| 2016/0109946 A1 | 4/2016 | George-Svahn |

* cited by examiner

NOTIFICATION INTERACTION IN A TOUCHSCREEN USER INTERFACE

BACKGROUND

The present invention relates to touchscreen user interfaces, and more specifically, to notification interaction in a touchscreen user interface.

A mobile computing device such as a smart phone or tablet with a touchscreen user interface may have multiple layers on the graphical user interface (GUI) that the user may interact with. It is often not possible for the user to access different layers of the GUI due to the top layer taking preference. For example, a top layer may be a pop-up box with an event notification, or an instant messaging chat window, etc.

In one example, a notification, such as an advert, an update, or a message notification, may be provided as a layer over an open application on a GUI. The user may not be able to access the application behind the area of the notification without removing or closing the notification.

Additionally, if a user is typing or interacting with an application and a notification appears as a layer on top of the application, the user may interact with the notification by mistake because that layer has preference over the application in which the user was typing leading to errors and frustration by the user. For example, a user is texting, they receive a pop up notification about an update and they unintentionally press the OK button, resulting in an unintentional update.

BRIEF SUMMARY

According to an aspect of the present invention there is provided a computer-implemented method for a computer-implemented method for notification interaction in a touchscreen user interface, comprising: monitoring a user interaction with a current application via the touchscreen user interface; recognizing that a notification is being prepared to be displayed as a notification display on top of the current application; selecting a distinct user interaction for input to the notification display that is distinct from the monitored user interaction with the current application; and displaying an instruction for the distinct user interaction with the notification display.

According to a further aspect of the present invention there is provided a system for a system for notification interaction in a touchscreen user interface, comprising: a processor and a memory configured to provide computer program instructions to the processor to execute the function of the following components; a user interaction monitoring component for monitoring a user interaction with a current application via the touchscreen user interface; a notification preparation component for recognizing that a notification is being prepared to be displayed as a notification display on top of the current application; a user interaction selection component for selecting a distinct user interaction for input to the notification display that is distinct from the monitored user interaction.

According to a further aspect of the present invention there is provided a computer program product for a computer program product for notification interaction in a touchscreen user interface, the computer program product comprising a computer readable storage medium having program instructions embodied therewith, the program instructions executable by a processor to cause the processor to: monitor a user interaction with a current application via the touchscreen user interface; recognize that a notification is being prepared to be displayed as a notification display on top of the current application; select a distinct user interaction for input to the notification display that is distinct from the monitored user interaction with the current application; and display an instruction for the distinct user interaction with the notification display.

BRIEF DESCRIPTION OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings.

Preferred embodiments of the present invention will now be described, by way of example only, with reference to the following drawings in which.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

The described method and system log the current form of interaction with a touchscreen user interface, such as, as examples, typing by tapping the screen, using a particular gesture repetitively for a game, scrolling through text or photos, or making a movement with the device having the touchscreen user interface. When a notification display is detected as upcoming, a different, distinct user interaction is activated for interaction with any controls in the notification display or with the notification display itself. The different, distinct user interaction is automatically determined in order to ensure it is not confusable with the current form of user interaction.

A computing device may have a touchscreen user interface having multiple layers of a graphical user interface (GUI) for simultaneously interacting with multiple applications and the mobile operating system. A computing device may be, for example, a smartphone, a tablet computer, a personal digital assistant, a smart watch, or another form of device having a touchscreen user interface.

A touchscreen user interface is an input and output device provided with an electronic visual display of a computing device. The user can use the touchscreen to react to what is displayed by making inputs or control the computing device through simple or multi-touch gestures by touching the screen with a special stylus or one or more fingers.

When interacting with a device, the user may interact with different layers of the GUI. GUI layers are used as a means to separate out various related interface elements to their own groups, for example, as belonging to a specific application. The layers may be thought of as transparent superimposed slides providing GUI controls for a particular group. The use of layers enables entire groups of controls to be turned on or off simultaneously thereby controlling which interface elements the user may interact with.

Figure 1:
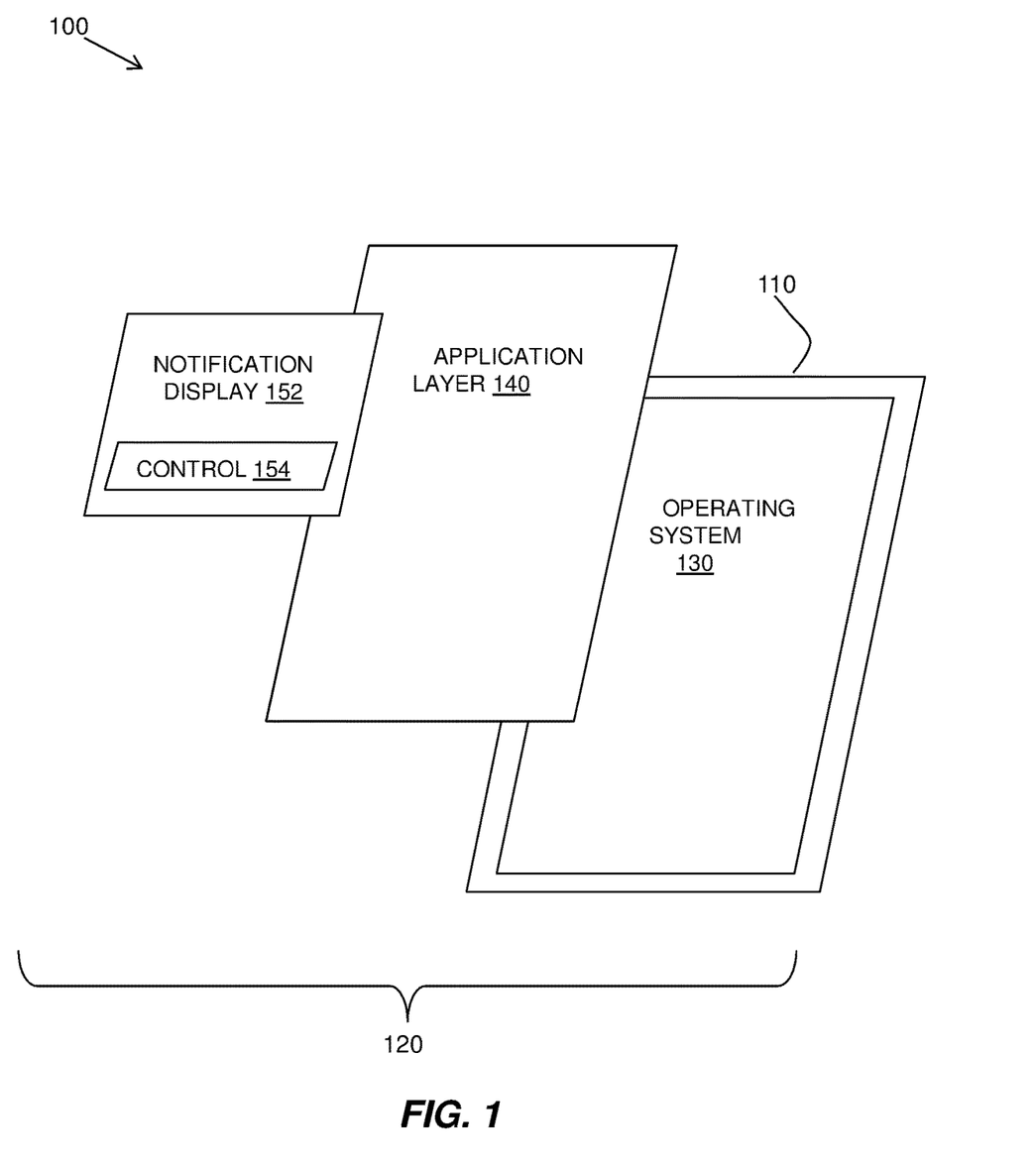
FIG. 1 is a schematic diagram of a mobile device having layers in a touchscreen user interface.

Referring to FIG. 1, an exploded schematic diagram 100 shows an example embodiment of a mobile computing device 110 with a touchscreen user interface 120. The touchscreen user interface 120 may include layers such as an operating system user interface layer 130 and application user interface layers 140. Each application may user multiple layers if it requires superimposed displays for the application content.

A notification display 152 may use a top user interface layer that may be an application user interface layer 140 or a layer used by the operating system for alerts, or other forms of prioritized content. The notification display 152 is usually provided in the form of a smaller window in the touchscreen user interface and may be used to display information, such as a pop-up notification, advert, or alert, and may include one or more control elements 154 for interacting with the notification display 152.

Notification displays 152 may display information provided by a variety of user interface implementations. Notification displays 152 may be controlled by the operating system or middleware in an application operating on the operating system. Notification displays 152 may be in the form push notifications. The actors sending a push notification may include a operating system push notification service (OSPNS), an application publisher that enables an application with an OSPNS, or a client application in the form of an operating specific application installed on a device for receiving incoming notifications.

Notification displays 152, whatever form they take, generally have the common property that they require interaction to action them, remove them, or the elapse of a predefined time period before they are no longer displayed on top of a current application and the user can revert to their activity on a current application.

Notification displays 152 may be prioritized content from the operating system or applications other than the application currently being used and displayed on the user interface. Notification displays 152 may be alerts from the operating system or from applications that have settings in the operating system enabling alerts to be displayed. In another scenario, notification displays 152 may be modal windows of the application currently being used and displayed on the user interface to notify the user of information that is relevant to the current application.

Using the described method and system, when a notification display 152 is activated, a background process determines a user interaction for the notification display that is distinct from the current user interaction with the current application 140.

Figure 2:
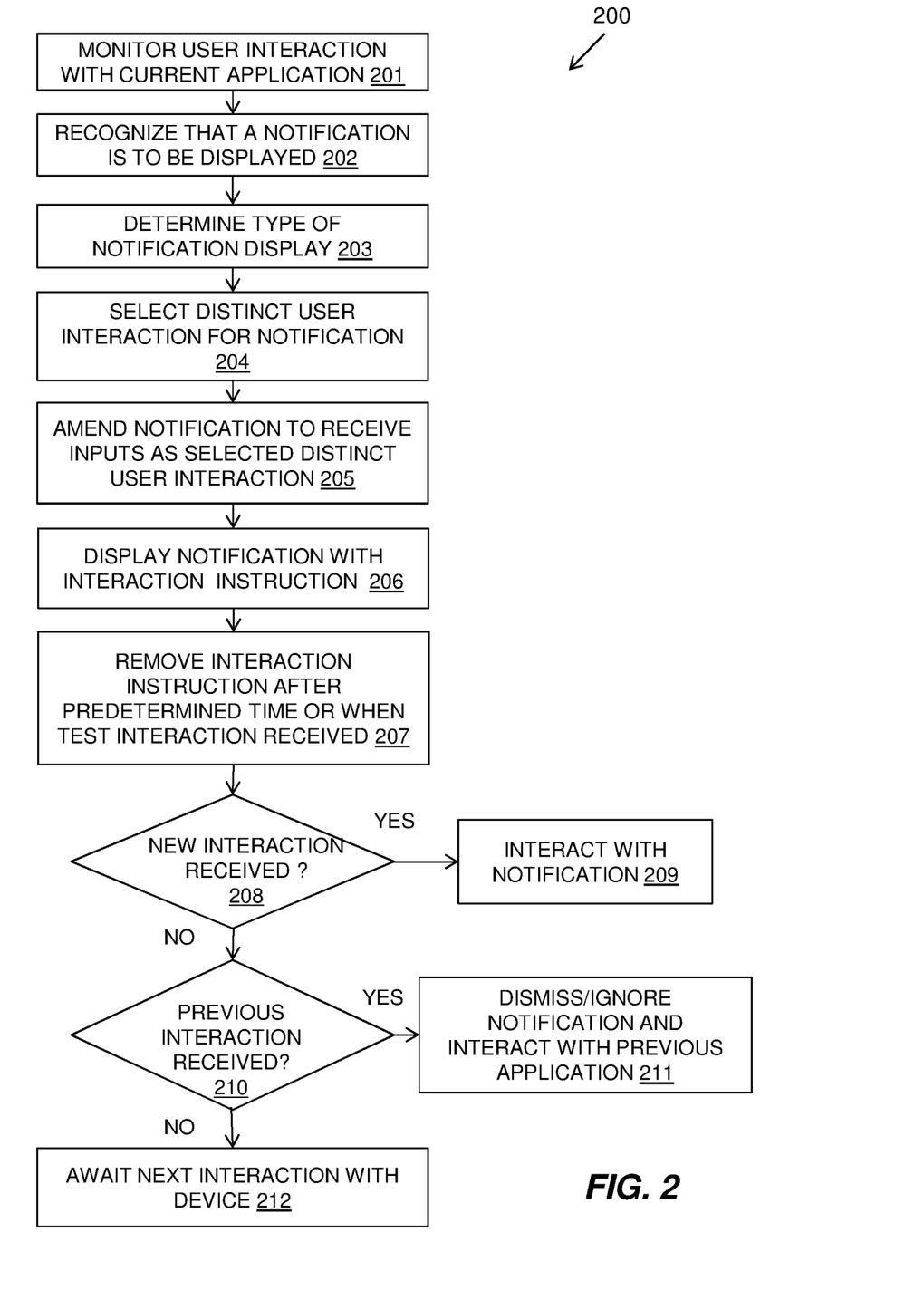
FIG. 2 is a flow diagram of an example embodiment of a method in accordance with the present invention.

Referring to FIG. 2, a flow diagram 200 illustrates an example embodiment of an aspect of the described method as carried out by an operating system functionality of a mobile computing device.

A current application may be running in a current layer being interacted with by a user of the mobile computing device and the method may monitor 201 and log the user interaction with the current application. The user interaction may include one or more gestures, movement of the device, and other forms of receiving user input into the device.

An event may occur in an application or the operating system and the application or operating system may prepare to provide a notification display providing information on top of the current user interface layer of the current application. The method may recognize 202 that a notification display is about to be displayed. The implementation of this recognition may depend on the type of notification, for example, a notification from an operating system push notification service (OSPNS), or an in-application notification.

The application may be a background application running simultaneously with the current application or may be the current application itself. For example, a background application may be an instant messaging application and an event may be the receipt of an incoming message. In another example, the current application may generate events that create modal windows. In a further example, the operating system may generate alerts or notifications relating to its functionality or that of other applications.

The method may determine 203 the type of notification display that is to be displayed in order to determine the properties of the notification and the nature of required inputs.

The method may select 204 a distinct user interaction for the notification. The selection may be made automatically to ensure that the user interaction for the notification is distinct from the user interaction that has been monitored and logged for the current application. The selection 204 may be based on rules, for example, if a current user interaction uses a combination of gestures, the distinct user interaction may be selected to be different to all the current gestures.

In one embodiment, the distinct user interaction may be an opposite form of interaction compared to the current user interaction. Examples, of opposite forms of interaction may be tapping as opposed to swiping, swiping as opposed to drawing a star shape, or tapping as opposed to drawing a circle. More than one user interaction may be selected if the notification requires different inputs.

The selection may also take into account the type of notification that is to be displayed to ensure that the gesture is suitable for use with the notification. The distinct user interaction or interactions may be used for dismissing or ignoring the notification display and/or interacting with it.

The notification may also disable any input to it using the previous type of user interaction to ensure that a user input intended for the current application is not input in error.

The method may amend 205 the notification display to receive user inputs in the form of the selected distinct user interaction(s).

The display notification may be displayed 206 with an interaction instruction. For example, this may give a graphical illustration of one or more gestures to be used in the user interaction for the notification. The interaction instruction may be removed 207 after a predetermined time in order to enable the user to start interacting with the notification. Alternatively, a sample or test user interaction may be received as input by the user triggering the removal of the interaction instruction.

It may be determined 208 if the new user interaction is received. If so, the user may interact 209 with the notification. If not it may be determined if the previous user interaction is received 210. If so, the notification may be dismissed or ignored 211 and the user may continue to interact with the previous application. Whether the notification is dismissed or ignored may depend on the settings set by the application. The notification may be set to be ignored if the notifications are not important; however, they may be set to be ignored if the user may want to revert to the notification at a later time and this prevents users accidentally closing the notification without reading it. If neither user interaction is received, the method may await 212 the next interaction with the device.

Figure 3A:
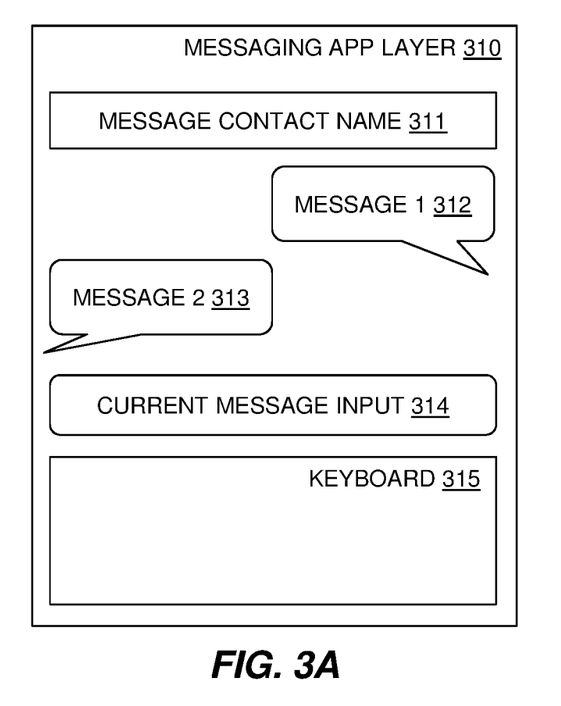
FIGS. 3A and 3B are schematic diagrams of an example embodiment in accordance with the present invention.
Figure 3B:
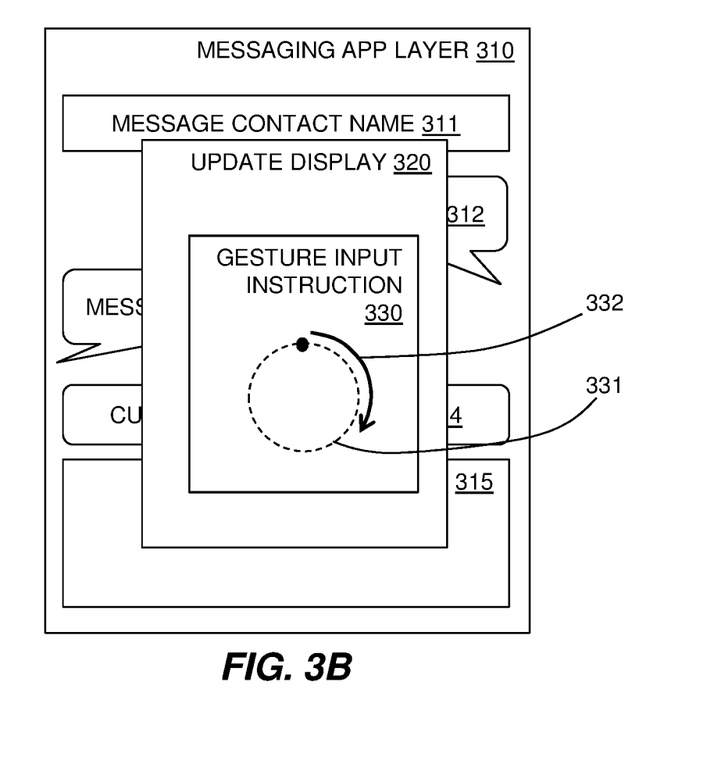

Referring to FIGS. 3A and 3B, schematic diagrams are used to illustrate an example implementation of the described method and system. A current application layer may be a messaging application layer 310 in which a message contact name 311 may be displayed along with the last few entries in a message conversation 312, 313. A keyboard input control 315 may be provided for input of characters of a message by tapping and a current message input 314 may display the current message as it is input.

FIG. 3B shows that a notification display is displayed in the form of an update display 320. As the current user interaction has been monitored as tapping, a distinct user interaction is selected to draw a circle. The notification is amended to only respond to the selected distinct user interaction. This ensures that if the user did not see the notification display and accidentally taps on the notification display, the user will not trigger the update.

A gesture input instruction 330 may be displayed for a set time with the update display 330 giving the user time to learn which gesture to use to interact with the update display 320. The gesture input instruction 330 may then disappear enabling the user to interact with the update display. In this example, as the current user interaction is tapping the display to use the keyboard, the distinct user interaction is selected to be a circle gesture 331. The gesture input instruction 330 shows the full circle to be input 331 and the direction shown by an arrow 332.

Examples of user interaction may be: tapping such as texting input of a repetitive movement when playing a game; swiping such as when using a drawing application, scrolling though text, photos or social media, or playing a game; rotation of a device by turning the screen away from the user; vibration by shaking the device; simultaneous gestures such as swipe and tap; spinning the phone around such that a centrifugal force is recognized.

Figure 4:
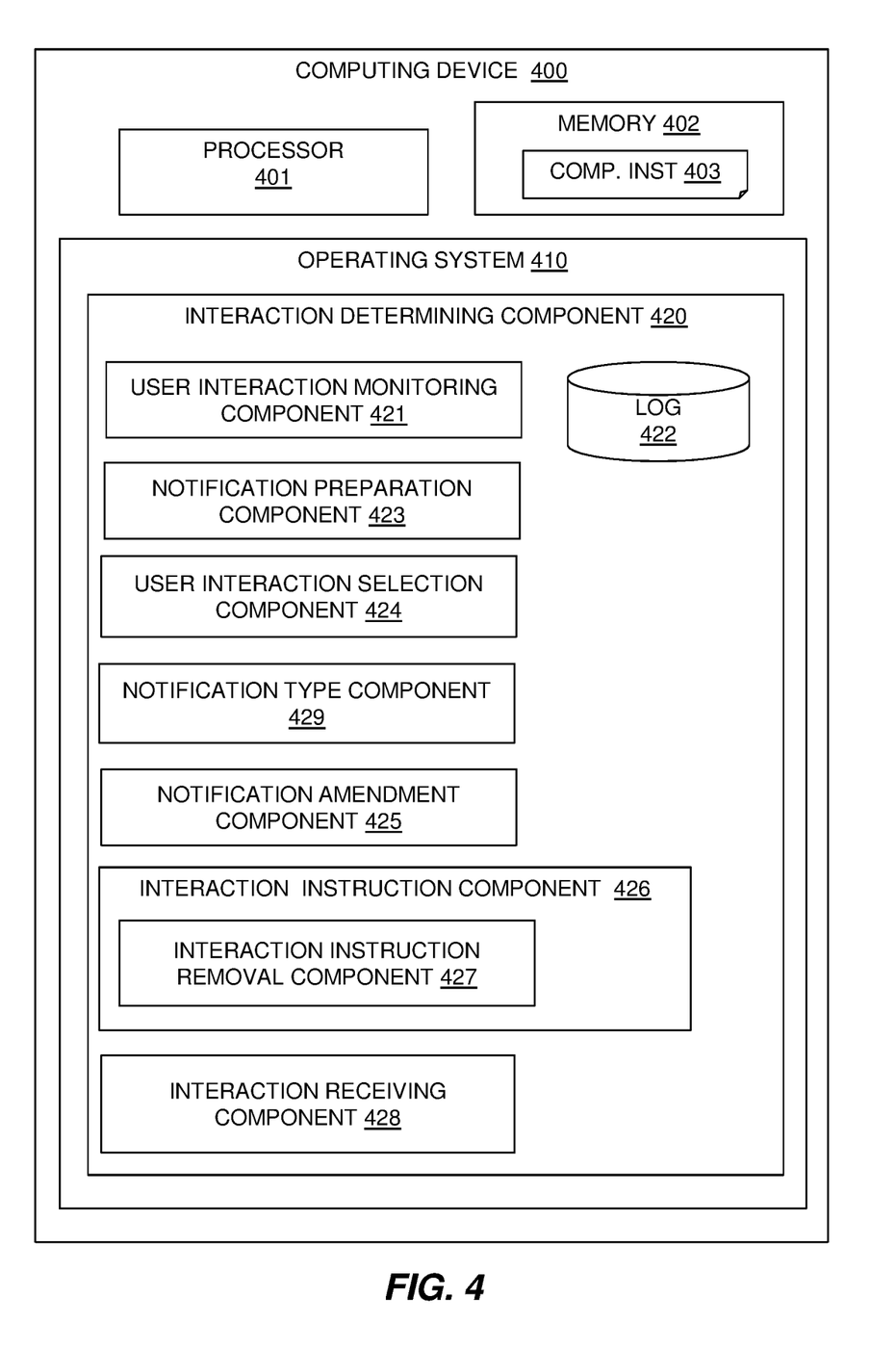
FIG. 4 is a block diagram of an example embodiment of a system in accordance with the present invention.

Referring to FIG. 4, an interaction determining component 420 is described that may be provided as a functional modification to an operating system 410 of a computing device 400 with a touchscreen user interface. The functional modification may be incorporated into an operating system push notification service (OSPNS).

The computing device 400 may include at least one processor 401, a hardware module, or a circuit for executing the functions of the described components which may be software units executing on the at least one processor. Memory 402 may be configured to provide computer instructions 403 to the at least one processor 401 to carry out the functionality of the components.

The interaction determining component 420 may include user interaction monitoring component 421 for monitoring a user interaction with a current application via the touchscreen user interface. The user interaction monitoring component 421 may log the user interactions in a log 422 that may store user interactions for a set period of time prior to the current time.

The interaction determining component 420 may include a notification preparation component 423 for recognizing that an event providing a notification display has occurred. An event may be an event from the current application, another application, or the operating system.

The interaction determining component 420 may include a user interaction selection component 424 for selecting a user interaction for the notification display that is distinct from the current user interaction that has been logged.

The interaction determining component 420 may include a notification type component 429 for determining the type of notification display to be displayed and using the properties of the type of notification by the user interaction selection component 424 when selecting a distinct user interaction.

The interaction determining component 420 may include a notification amendment component 425 for amending the notification to record that it recognizes inputs in the form of the selected distinct user interaction. The notification amendment component may also ignore previous user interactions to prevent unintentional input.

The interaction determining component 420 may include an interaction instruction component 426 for adding an interaction instruction to the notification display. The interaction instruction component 426 may include an interaction instruction removal component 427 for removing the interaction instruction after a predetermined period of time or when a sample interaction is received.

The interaction determining component 420 may include an interaction receiving component 428 for recognizing an incoming interaction as instructing the notification display or the current application. The interaction receiving component 428 may also determine that an input is received in the form of the monitored user interaction, dismissing or ignoring the notification display, and enabling continued interaction with the current application.

The described method and system prevent accidental interactions with notifications while the user is using the device and ensures that the user intentionally interacts with the notification before acting upon it.

Figure 5:
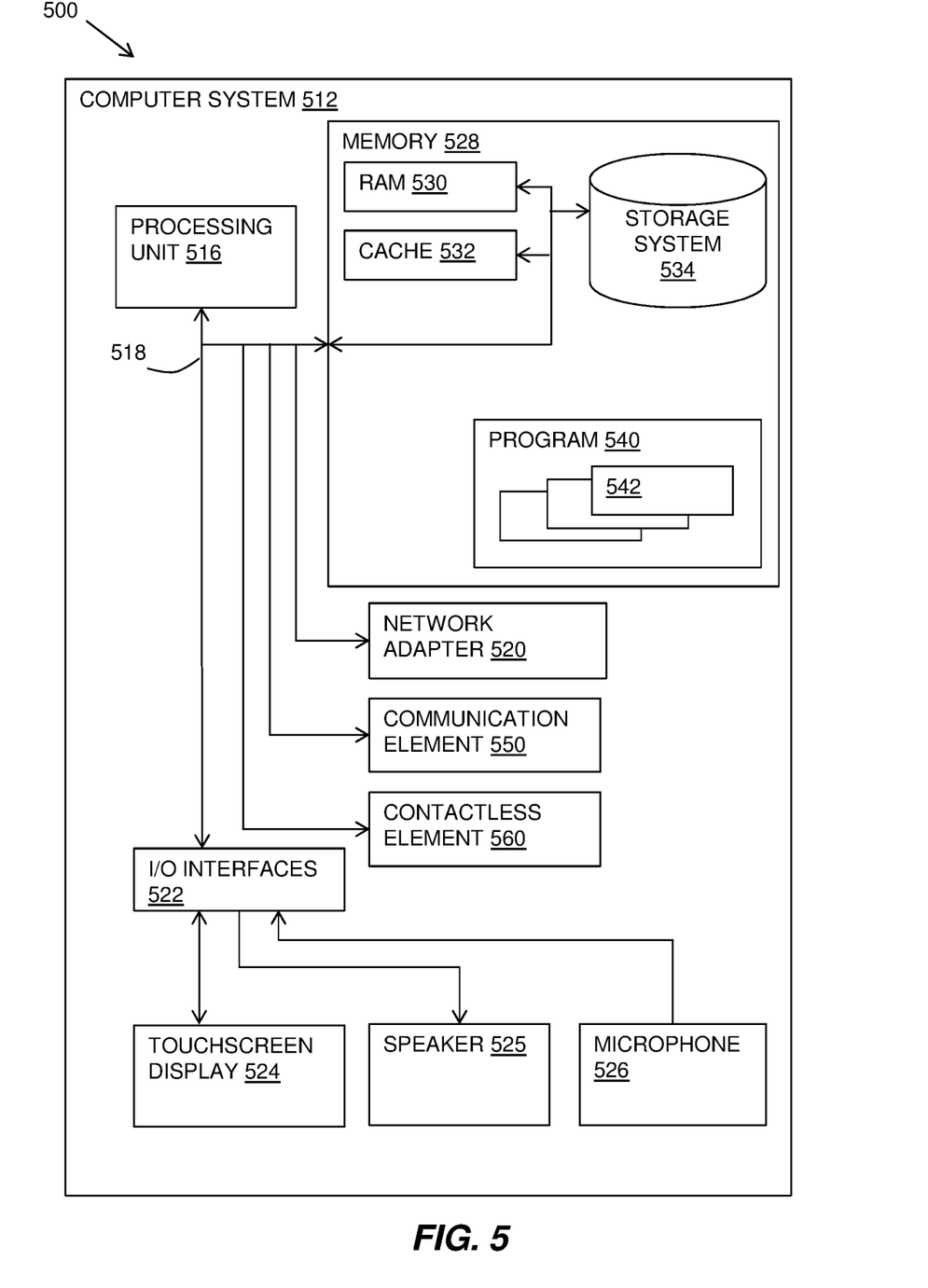
FIG. 5 is a block diagram of an example embodiment of a computing device in which the present invention may be implemented.

Referring now to FIG. 5, a schematic of an example of a system 500 which may be a form of a computing system 512 with a touchscreen user interface on which the described system may be implemented.

The computer system 512 may be operational with numerous other general purpose or special purpose computing system environments or configurations. Examples of well-known computing systems, environments, and/or configurations that may be suitable for use with computer system 512 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 512 may be described in the general context of computer system-executable instructions, such as program modules, being executed by a computer system. Generally, program modules may include routines, programs, applications, objects, components, logic, data structures, and so on that perform particular tasks or implement particular abstract data types. The computer system 512 may be used in distributed cloud computing environments where tasks are performed by remote processing devices that are linked through a communications network. In a distributed cloud computing environment, program modules may be located in both local and remote computer system storage media including memory storage devices.

In FIG. 5, a computer system 512 is shown in the form of a general-purpose computing device. The components of the computer system 512 may include, but are not limited to, one or more processors or processing units 516, a system memory 528, and a bus 518 that couples various system components including system memory 528 to processor 516.

Bus 518 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system 512 typically includes a variety of computer system readable media. Such media may be any available media that is accessible by computer system 512, and it includes both volatile and non-volatile media.

System memory 528 can include computer system readable media in the form of volatile memory, such as random access memory (RAM) 530 and/or cache memory 532. By way of example only, storage system 534 may be provided for reading from and writing to a non-removable, non-volatile magnetic media (not shown and typically called a "hard drive"). As will be further depicted and described below, memory 528 may include at least one program product having a set (e.g., at least one) of program modules that are configured to carry out the functions of embodiments of the invention.

Program/utility 540, having a set (at least one) of program modules 542, may be stored in memory 528 by way of example, and not limitation, as well as an operating system, one or more application programs, other program modules, and program data. Each of the operating system, one or more application programs, other program modules, and program data or some combination thereof, may include an implementation of a networking environment. Program modules 542 generally carry out the functions and/or methodologies of embodiments of the invention as described herein.

The computer system 512 may include Input/Output (I/O) interfaces 522 that enable a user to interact with the computer system 512 via a touchscreen display 524. The computer system 512 may also communicate with any devices (e.g., network card, modem, etc.) that enable computer system 512 to communicate with one or more other computing devices. Still yet, computer system 512 can communicate with one or more networks such as a local area network (LAN), a general wide area network (WAN), and/or a public network (e.g., the Internet) via network adapter 520. As depicted, network adapter 520 communicates with the other components of computer system 512 via bus 518.

It should be understood that although not shown, other hardware and/or software components could be used in conjunction with the computer system 512. Examples, include, but are not limited to: a camera, microphone, speakers, etc.

The computing device 512 may be a communication device, such as a mobile smart phone, and the processing unit 516 may be a microprocessor for processing the functions of the communication device and the touchscreen display 524 may allow a user to see the phone numbers and other information and messages. The touchscreen display 524 may allow a user to input information into the device, a speaker 525 may allow the user to hear voice communication, music, etc., and a microphone 526 may allow the user to transmit his or her voice through the communication device.

The communication device may also include a communication element 550 for connection to communication channels including a cellular telephone network, data transmission, etc. The communication element 550 may include an associated wireless transfer element, such as an antenna.

The communication element 550 may include a subscriber identity module (SIM) in the form of an integrated circuit that stores an international mobile subscriber identity and the related key used to identify and authenticate a subscriber using the communication device. One or more subscriber identity modules may be removable from the communication device or embedded in the communication device.

The communication device may further include a contactless element 560, which is typically implemented in the form of a semiconductor chip (or other data storage element) with an associated wireless transfer element, such as an antenna. The contactless element 560 may be associated with (e.g., embedded within) the communication device and data or control instructions transmitted via a cellular network may be applied to the contactless element 560 by means of a contactless element interface (not shown). The contactless element interface may function to permit the exchange of data and/or control instructions between mobile device circuitry (and hence the cellular network) and the contactless element 560.

The contactless element 560 may be capable of transferring and receiving data using a near field communications (NFC) capability (or near field communications medium) typically in accordance with a standardized protocol or data transfer mechanism (e.g., ISO 14443/NFC). Near field communications capability is a short-range communications capability, such as radio-frequency identification (RFID), Bluetooth, infra-red, or other data transfer capability that can be used to exchange data between the communication device Y00 and an interrogation device. Thus, the communication device may be capable of communicating and transferring data and/or control instructions via both a cellular network and near field communications capability.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Improvements and modifications can be made to the foregoing without departing from the scope of the present invention.

What is claimed is:

1. A computer-implemented method for notification interaction in a touchscreen user interface, comprising:
   monitoring, by a computing device, a user interaction with a current application via the touchscreen user interface;
   preparing, by a computing device, a notification display for an event occurring on the computing device to be displayed on top of the current application, the notification display being prepared by at least one of an operating system resident on the computing device or a middleware in an application operating on the computing device;
   recognizing, by the computing device, that a notification display for an event is about to be displayed on top of the current application in use by the user, wherein the notification is recognized by at least one of the group consisting of: the current application, a secondary application, or the operating system resident on the computing device;
determining, by the computing device, one or more distinct user interactions for input to the notification display based on a set of rules, wherein the set of rules determines one or more distinct user interactions that are different from the monitored user interaction with the current application;
selecting, by the computing device, a distinct user interaction for input by the user to the notification display that is distinct from the monitored user interaction with the current application; and
displaying, by the computing device, the notification display with an instruction for input of the distinct user interaction with the notification display.

2. The method as in claim 1, further comprising:
logging, by the computing device, multiple user interactions with the current application for a predefined time prior to a current time and selecting a distinct user interaction that is distinct from the logged user interactions.

3. The method as in claim 1, further comprising
determining, by the computing device, a type of the notification display and selecting the distinct user interaction to suit the type of the notification display based on properties of the notification display.

4. The method as in claim 1, wherein a distinct user interaction is an opposite or different user input, and wherein user inputs include touchscreen gestures and/or device movements.

5. The method as in claim 1, further comprising
amending, by the computing device, the notification display to recognize inputs using the distinct user interaction.

6. The method as in claim 1, further comprising
amending, by the computing device, the notification display to ignore previous user interactions to prevent unintentional input.

7. The method as in claim 1, further comprising:
removing, by the computing device, the display of the instruction for the distinct user interaction after a predefined period of time.

8. The method as in claim 1, further comprising
removing, by the computing device, the display of the instruction for the distinct user interaction after receiving a sample input using the distinct user interaction.

9. The method as in claim 1, further comprising
determining, by the computing device, that an input is received in the form of the distinct user interaction and enabling interaction with the notification display.

10. The method as in claim 1, further comprising
determining, by the computing device, that an input is received in the form of the monitored user interaction, dismissing or ignoring the notification display, and enabling continued interaction with the current application.

11. A system for notification interaction in a touchscreen user interface, the computer system comprising
one or more computer processors, one or more computer readable storage media, and program instructions stored on the one or more computer readable storage media for execution by at least one of the one or more processors, the program instructions comprising:
program instructions to monitor a user interaction with a current application via the touchscreen user interface;
program instructions to prepare, by a computer processor, a notification display for an event occurring on the computing device to be displayed on top of the current application, the notification display being prepared by at least one of an operating system resident on the computer processor or a middleware in an application operating on the computer processor;
program instructions to recognize that a notification display for an event is about to be displayed as a notification display on top of the current application in use by the user, wherein the notification is recognized by at least one of the group consisting of: the current application, a secondary application or the operating system resident on the computer processor;
program instructions to determine one or more distinct user interactions for input to the notification display based on a set of rules, wherein the set of rules determines one or more distinct user interactions that are different from the monitored user interaction with the current application;
program instructions to select a distinct user interaction for input by the user to the notification display that is distinct from the monitored user interaction with the current application; and
program instructions to display the notification display with an instruction for input of the distinct user interaction with the notification display.

12. The computer system as in claim 11, wherein program instructions to select a distinct user interaction for input to the notification display that is distinct from the monitored user interaction with the current application, further comprises:
program instructions to log multiple user interactions with the current application for a predefined time prior to the current time and the user interaction selection component selects a distinct user interaction that is distinct from the logged user interactions.

13. The computer system as in claim 11, further comprising:
program instructions to determine a type of the notification display and selecting the distinct user interaction to suit the type of the notification display based on properties of the notification display.

14. The computer system as in claim 11, further comprising
program instructions to amend the notification display to recognize inputs using the distinct user interaction.

15. The computer system as in claim 14, wherein the program instructions to amend the notification display to recognize inputs using the distinct user interaction amends the notification display to ignore previous user interactions to prevent unintentional input.

16. The computer system as in claim 11, further comprising
program instructions to remove the display of the instruction for the distinct user interaction after a predefined period of time.

17. The computer system as in claim 16, wherein the program instructions to remove the display of the instruction for the distinct user interaction after a predefined period of time removes the display of the instruction for the distinct user interaction after receiving a sample input using the distinct user interaction.

18. The computer system as in claim 11, further comprising:
- program instructions to determine that an input is received in the form of the distinct user interaction and enabling interaction with the notification display.

19. The computer system as in claim 18, wherein program instructions to determine that an input is received in the form of the distinct user interaction and enabling interaction with the notification display determines that an input is received in the form of the monitored user interaction, dismisses or ignores the notification display and enables continued interaction with the current application.

20. A computer program product for notification interaction in a touchscreen user interface, the computer program product comprising:
- a computer readable storage medium having program instructions embodied therewith, the program instructions comprising:
- program instructions to monitor a user interaction with a current application via the touchscreen user interface;
- program instructions to prepare, by a computing device, a notification display for an event occurring on the computing device to be displayed on top of the current application, the notification display being prepared by at least one of an operating system resident on the computing device or a middleware in an application operating on the computing device;
- program instructions to recognize that a notification display for an event is about to be displayed as a notification display on top of the current application, wherein the notification is recognized by at least one of the group consisting of: the current application in use by the user, a secondary application or the operating system resident on the computing device;
- program instructions to determine one or more distinct user interactions for input to the notification display based on a set of rules, wherein the set of rules determines one or more distinct user interactions that are different from the monitored user interaction with the current application;
- program instructions to select a distinct user interaction for input by the user to the notification display that is distinct from the monitored user interaction with the current application; and
- program instructions to display the notification display with an instruction for input of the distinct user interaction with the notification display.

* * * * *